US010878472B2

(12) United States Patent
Korkalo

(10) Patent No.: US 10,878,472 B2
(45) Date of Patent: Dec. 29, 2020

(54) SYSTEM AND METHOD FOR MANAGING CLASSIFICATIONS IN DIGITAL STORES

(71) Applicant: RRC Networks Oy, Oulu (FI)

(72) Inventor: Mikko Tuomas Korkalo, Muhos (FI)

(73) Assignee: RRC Networks Oy, Oulu (FI)

( * ) Notice: Subject to any disclaimer, the term of this patent is extended or adjusted under 35 U.S.C. 154(b) by 340 days.

(21) Appl. No.: 15/347,919

(22) Filed: Nov. 10, 2016

(65) Prior Publication Data

US 2017/0132684 A1    May 11, 2017

Related U.S. Application Data

(60) Provisional application No. 62/253,515, filed on Nov. 10, 2015.

(51) Int. Cl.
*G06Q 30/06* (2012.01)
*H04L 29/08* (2006.01)
*H04L 29/06* (2006.01)

(52) U.S. Cl.
CPC ......... *G06Q 30/0623* (2013.01); *H04L 63/08* (2013.01); *H04L 67/16* (2013.01); *G06Q 2220/00* (2013.01)

(58) Field of Classification Search
CPC ............ G06Q 30/0623; G06Q 2220/00; H04L 63/08; H04L 67/16
See application file for complete search history.

(56) References Cited

U.S. PATENT DOCUMENTS

| 7,426,635 | B1 * | 9/2008 | Parkhill | H04L 63/0823 |
| | | | | 705/50 |
| 8,185,552 | B1 * | 5/2012 | Chow | G06Q 30/02 |
| | | | | 707/791 |
| 8,756,432 | B1 * | 6/2014 | Chen | G06F 21/565 |
| | | | | 713/187 |
| 9,219,724 | B1 * | 12/2015 | Choudhary | G06F 16/21 |
| 10,445,499 | B1 * | 10/2019 | Xu | G06F 16/285 |
| 2009/0125377 | A1 * | 5/2009 | Somji | G06Q 30/02 |
| | | | | 705/14.49 |
| 2014/0136443 | A1 * | 5/2014 | Kinsey, II | G06Q 10/063116 |
| | | | | 705/347 |

(Continued)

*Primary Examiner* — Jay Huang
*Assistant Examiner* — Courtney Patrice Jones
(74) *Attorney, Agent, or Firm* — Ziegler IP Law Group, LLC

(57) ABSTRACT

Disclosed is a method and system for managing a service associated with a service provider. The method includes receiving from at least one classification provider, a request for registration as classifying authority with a platform, wherein the platform is associated with a digital store, approving the received request for registration of the at least one classification provider, classifying the service and/or the service provider by the registered at least one classification provider to generate classification information pertaining to the service and/or the service provider, and hosting the classified service by the platform. The system includes a computing device associated with a platform provider, at least one device associated with at least one classification provider registered as a classification authority with the platform to classify the service and/or the service provider, and a service provider device associated with the service provider of the classified service.

16 Claims, 3 Drawing Sheets

(56) References Cited

U.S. PATENT DOCUMENTS

| | | | |
|---|---|---|---|
| 2014/0143216 A1* | 5/2014 | Shear | G06Q 20/3674 |
| | | | 707/694 |
| 2015/0052064 A1* | 2/2015 | Karpenko | G06Q 20/3829 |
| | | | 705/71 |
| 2015/0379559 A1* | 12/2015 | Saxena | G06Q 30/0246 |
| | | | 705/14.45 |
| 2016/0132948 A1* | 5/2016 | Saveliev | G06Q 30/0611 |
| | | | 705/26.4 |
| 2016/0173286 A1* | 6/2016 | Gallagher | H04L 9/321 |
| | | | 713/156 |
| 2016/0248746 A1* | 8/2016 | James | H04W 4/70 |
| 2017/0004548 A1* | 1/2017 | Goel | G06Q 30/0282 |
| 2017/0118029 A1* | 4/2017 | Salmi | H04L 9/3268 |

* cited by examiner

SYSTEM AND METHOD FOR MANAGING CLASSIFICATIONS IN DIGITAL STORES

TECHNICAL FIELD

The present disclosure relates generally to distribution of services; and more specifically, to a method and system for managing a service associated with a service provider.

BACKGROUND

Nowadays, use of digital stores or marketplaces for distribution of services (or products) is rapidly increasing. Typically, such services are distributed between service providers and customers via advertisements and/or listings at such digital stores. For example, there exist distinct digital application stores for distribution of applications designed to run on different operating systems. Examples of such applications include, but are not limited to schedulers, navigators, photo editors, games, calculators, and music editors. Generally, such digital stores are "open markets" and are unregulated. Therefore, any entity (individual or enterprise) offering services may enlist as a service provider with such digital stores In recent times, there has been an increase in presence of malicious services available at such digital stores. For example, malicious applications may be present at a digital application store and such malicious applications may publish malware (such as computer viruses, worms, and so forth) in the digital application store. With increase in number of service providers and such digital stores, identification of genuine services versus malicious services is becoming difficult. Conventional techniques for managing services available at such digital stores include auditing and verifying legitimacy of all services listed at such digital stores. However, such conventional techniques are time consuming, and are often inefficient in distinguishing between genuine services and malicious services.

Therefore, in light of the foregoing discussion, there exists a need to overcome the aforementioned drawbacks associated with conventional techniques for administering services available across digital stores.

SUMMARY

The present disclosure seeks to provide a method for managing a service associated with a service provider. The present disclosure also seeks to provide a system for managing a service associated with a service provider. The present disclosure seeks to provide a solution to the existing problem of identifying presence of malicious services at a digital application store. An aim of the present disclosure is to provide a solution that overcomes at least partially the problems encountered in prior art, and provides a reliable solution for distinguishing between genuine services and the malicious services.

Further disclosure is related to making all kinds of classifications possible. An example case and need is for enabling control by clients (eg. Corporations) to allow for example audited software to be installed on end user devices. Additionally managing security is enabled by disclosure point as well as increasing security and providing security controls. Disclosure is further related to allowing customer to choose whom to trust instead of trusting blindly the platform provider is also a major factor of benefit of this technology.

In one aspect, an embodiment of the present disclosure provides a method for managing a service associated with a service provider, the method comprising:
    receiving from at least one classification provider, request for registration as classifying authority with a platform, wherein the platform is associated with a digital store;
    approving the received request for registration of the at least one classification provider;
    classifying the service and/or the service provider by the registered at least one classification provider to generate classification information pertaining to the service and/or the service provider; and
    hosting the classification information by the platform.

In another aspect, an embodiment of the present disclosure provides a system for managing a service associated with a service provider, the system comprising:
    a computing device associated with a platform provider, wherein the computing device is operable to implement a platform associated with a digital store;
    at least one device associated with at least one classification provider registered as a classification authority with the platform to classify the service and/or the service provider, wherein the at least one device is communicably coupled to the computing device via a network; and
    a service provider device associated with the service provider of the classified service, wherein the service provider device is communicably coupled to the computing device via the network.

Embodiments of the present disclosure substantially eliminate or at least partially address the aforementioned problems in the prior art, and enables reliable management of a service associated with a service provider.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
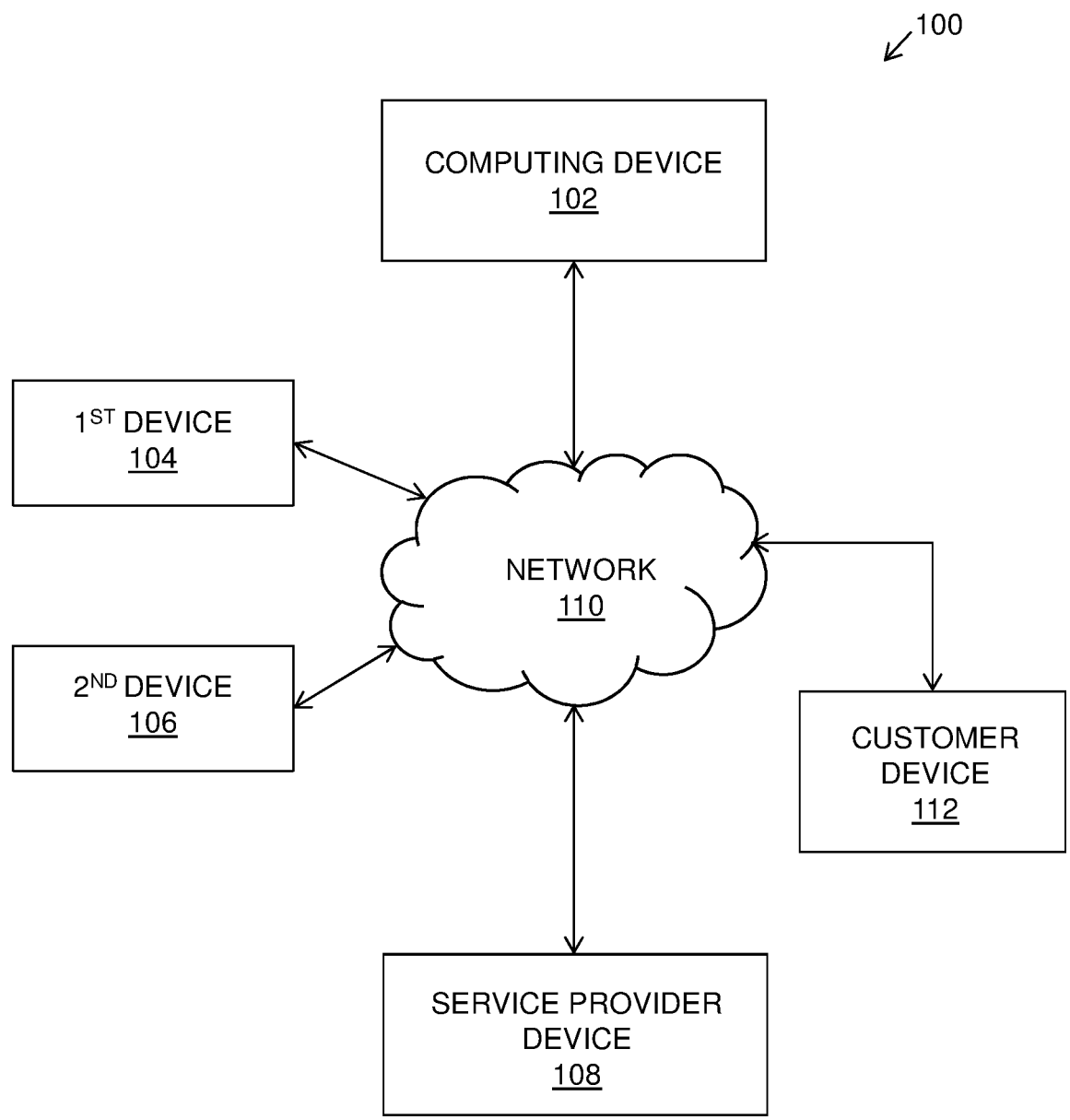
FIG. 1 is a schematic illustration of a system for managing a service associated with a service provider, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for managing a service associated with a service provider, the method comprising:
receiving from at least one classification provider, request for registration as classifying authority with a platform, wherein the platform is associated with a digital store;
approving the received request for registration of the at least one classification provider;
classifying the service and/or the service provider by the registered at least one classification provider to generate classification information pertaining to the service and/or the service provider; and
hosting the classification information by the platform.

In another aspect, an embodiment of the present disclosure provides a system for managing a service associated with a service provider, the system comprising:
a computing device associated with a platform provider, wherein the computing device is operable to implement a platform associated with a digital store;
at least one device associated with at least one classification provider registered as a classification authority with the platform to classify the service and/or the service provider, wherein the at least one device is communicably coupled to the computing device via a network; and
a service provider device associated with the service provider of the classified service, wherein the service provider device is communicably coupled to the computing device via the network.

The present disclosure provides a method and a system for managing a service associated with a service provider. The described method is easy to implement and efficient in distinguishing between genuine services and malicious services available at digital stores. Further, the described system for implementation of the method is inexpensive and robust. The method and system of the present disclosure also include measures to facilitate safe data transmissions and payments pertaining to management of the service between the platform provider, the at least one classification provider, the service provider, and the customer.

In an embodiment, the term 'service' used herein relates to tangible services (or products) such as personal care products, consumer durables, household supplies, software applications, toys, and so forth. Further, the term 'service' also relates to intangible services such as cleaning services, repairing or renovation services, electronic equipment installation services, and so forth. According to an embodiment of the present disclosure, the term 'service' relates to digital applications (such as event schedulers, photo editors, games, and so forth) designed to run on suitable (or compatible) equipment. Specifically, such services may be distributed to customers by service providers by offering such services via digital stores or marketplaces (such as e-commerce and application stores "app stores").

According to an embodiment, the term 'service provider' used herein relates to an entity having expertise in providing the service associated therewith. Specifically, the service provider may include an individual, a group of individuals, or an enterprise offering the service to customers via a platform associated with a digital store.

In an embodiment, the platform may be hardware, software, firmware or a combination of these, suitable for hosting/maintaining/storing/providing the classification information related to the service offered by the service provider at the digital store (such as a digital application store). Specifically, the platform may be utilised for hosting multiple services offered by multiple service providers. For example, a service provider A may offer three services and a service provider B may offer eight services for distribution to customers via the platform. Therefore, it may be evident that the platform provider may be an entity (such as an individual, an enterprise, and so forth) providing the platform for distribution of the service. Further the platform might be used to host other services such as e-commerce service in conjunction with hosting and maintaining classification information.

The method for managing the service associated with the service provider comprises receiving from at least one classification provider, request for registration as classifying authority with the platform, wherein the platform is associated with the digital store. Specifically, the request for registration as classifying authority may include certificate signing requests from the at least one classification provider to a platform provider. More specifically, the certificate signing requests may be a request for obtaining a classification certificate from the platform provider. It may be evident that a signed classification certificate issued by the platform provider to the at least one classification authority authenticates the at least one classification provider as a trusted classification authority with the platform. Further managing the service can be understood to managing and creating service classification information. Further managing the service can be understood as managing the platform over which the classification providers offers the services.

In an embodiment, the at least one classification provider may be an entity possessing credentials suitable for registration as classifying authority with the platform. Specifically, the at least one classification provider may be a trusted third party for classifying the service offered by the service provider.

For example, a certificate signing request from a classification provider X may be received by the platform provider. In such example, the classification provider X, requesting signed classification certificates from the platform provider, may generate a key pair comprising a private key and a public key of the classification provider X. In such example, the private key and the public key may be Rivest-Shamir-Adleman (RSA) keys. Further, the certificate signing request may include information pertaining to the classification provider X (such as identity and credentials thereof), and public key of the classification provider X for approval by the platform provider.

The method further comprises approving the received request for registration of the at least one classification provider. Specifically, upon approval of the received request, the at least one classification provider may register as classifying authority with the platform. In an embodiment, approving the received request for registration of the at least one classification provider comprises validating credentials of the at least one classification provider and providing classification certificates for the at least one classification provider. Specifically, the platform provider may examine the certificate signing requests from the at least one classification provider to validate (or verify) credentials of the at least one classification provider. Thereafter, upon successful validation of credentials, the platform provider may issue classification certificates for the at least one classification provider. For example, the platform provider may issue a digitally signed classification certificate binding a public key to the classification provider X (such as the generated public key of the key pair in the aforementioned example).

In an embodiment, the classification certificates for the at least one classification provider may be cryptographically verifiable. Specifically, such classification certificates may be electronic documents, for example, ITU-T standard X.509 certificates that may be digitally signed using a private key of the platform provider (issuer of the classification certificate). Thereafter, the digital certificate may be verified (or authenticated) using a public certificate (or public key) of the platform provider. Optionally, the classification certificates for the at least one classification provider may be valid for a pre-determined time period, for example, 5 years. More optionally, the validity of such classification certificates may be extended upon successful verification of credentials of the at least one classification provider, before end of the pre-determined time period.

According to an embodiment, the at least one classification provider may make a payment to the platform provider to obtain the classification certificates.

It may be evident that upon approval of the received request for registration of the at least one classification provider, the at least one classification provider registers as classifying authority with the platform. As classifying authority, the at least one classification provider may be authorised to classify the service associated with the service provider.

Thereafter, the method comprises classifying the service and/or the service provider by the registered at least one classification provider to generate classification information pertaining to the service and/or the service provider. Specifically, the service and/or the service provider may be classified according to criteria such as commonly used business metrics, prevalent certifications, rating on a scale of numbers, historical data, security related metrics, reliablity and so forth. It may be evident that the service provider requests the registered at least one classification provider for classification of the service and/or the service provider via the platform. Further, the service and/or the service provider may be classified only if information/credentials pertaining thereto are verified to be genuine and satisfactory by the registered at least one classification provider.

For example, the service provider may be classified according to historical data. In such instance, examples of the historical data include, but are not limited to, popularity of services offered by the service provider in the past, number of services offered by the service provider in the past, and past feedback of customers related to post-transaction assistance offered by the service provider. It may be evident that positive historical data in favour of the service provider may facilitate classification of the service provider.

In an example, the service may be classified according to commonly used business metrics. In such instance, the business metrics may include, but are not limited to, projected revenue generation capability of the service, estimated number of customers that may order the service, and so forth.

Further, the service may be classified by a Classification Provider that provides security auditing of the service. For example, a security audit may prove that a specific kind of security testing has been performed to the classified version of a software product in an application store.

Optionally, the service may be classified according to rating on a scale of 1 to 10. For example, the rating may be determined according to popularity of similar services in the digital store, specifications of the service, ease of implementation of the service, and so forth. In an example, a service P may be rated (or classified) equal to '8' if the service P offers more features and a user friendly interface as compared to a service Q with rating equal to '5'.

In another embodiment, the service and/or the service provider may be classified according to customized classifications specified by the customers (or any other end user such as business entities).

As described previously, classifying the service and/or the service provider by the registered at least one classification provider generates classification information pertaining to the service and/or the service provider. In an embodiment, the classification information pertaining to the service and/or the service provider may be in form of a digital certificate for example, ITU-T standard X.509 certificate. Specifically, the digital certificate may comprise granted classification of the service and/or the service provider. Optionally, the digital certificate may also include public key of the registered at least one classification provider and/or the service provider. According to an embodiment, the classification information pertaining to the service and/or the service provider may be cryptographically verifiable. Specifically, the classification information may be encrypted by the registered at least one classification provider and a digital signature thereof may be attached to the classification information. Verification can be done by verifying the signature (of classification information signed with private key) with the public key.

Further or alternatively the classification provider can be enabled/allowed to sell the classification information and allow decryption of encrypted signatures, that would normally be public and freely available. The preference of using encrypted in comparison to plain signatures is dependent on the business model and does not necessarily have implications in security. Encryption and decryption of the signature is optional in any other way. If Classification Provider is selling its services to Service Providers giving guarantees described above in the document, it would be preferred to publish the signatures for public. This would allow anyone to see and use the classification information provided for example in search criteria. If Classification Provider is selling its services to the end users or clients of the Service Provider it would be preferable to encrypt the Classification Information and provide the decryption keys for profit to other clients / buyers of classification information from said provider. This might allow Classification Provider to limit the use of classification information from other than parties intended.

Thereafter, the method comprises hosting the classified service by the platform. Specifically, the service provider may request the platform provider to host the classified service on the platform. In an embodiment, the classified service may be advertised by the service provider for distribution to customers via the platform. It may be evident that following classification of the service and/or the service provider by the registered at least one classification provider, the service may be understood to be a 'classified service'. In an example, the term 'classified service' relates to the service classified by the registered at least one classification provider. In another example, 'classified service' also relates to the service associated with the classified service provider. It may be evident that the service provider may offer multiple services. Therefore, obtaining classification of the service provider may be a more suitable alternative as compared to obtaining classification of each of the multiple services. In such instance, the multiple services offered by the classified service provider may be understood to be 'classified services'. Further classifying a service versus classifying a service provider might be different. A service provider might be classified by for example business metrics or following practices described in ISO certifications. Thus, certification will differ in the case of certifying the Service Provider and when certifying the Service itself. Certifying the Service Provider might not have direct relation to for example penetration testing or other software auditing done by an outside party to each of the published versions of the software in an application store. Additionally embodiments enable to require (as a client) a specific certification from a specific Certification Provider to allow the end user to install an application from an application store. This might be beneficial to increase safety of purchasing.

In an embodiment, the method may further comprise making a payment to the at least one classification provider to obtain the classification information pertaining to the service and/or the service provider. Specifically, the service provider may make the payment to the at least one classification provider via the platform.

In an embodiment, the method may further comprise receiving selection of the classified service from a customer. Specifically, the customer may be an entity, such as an individual or enterprise, interested in obtaining (or receiving) the classified service via the platform. Further, the selection of the classified service may depend on requirements of the customer. In an example, a customer C1 may require that the classified service may possess a classification Y. In another example, a customer C2 may require that the service provider of the classified service may possess a classification Z. In yet another example, a customer C3 may require that the classified service may possess the classification Y, and the service provider of such classified service may possess the classification Z.

In such embodiment, the method may further comprise transmitting the classification information pertaining to the selected classified service to the customer. Specifically, the platform provider may obtain the classification information from the service provider for transmission to the customer. Further, the method may comprise receiving verification of the transmitted classification information from the customer. Specifically, the customer may authenticate the digital signature attached to the classification information by using the public key of the registered at least one classification provider, private key of the customer, and decrypting the classification information. Upon successful verification of the transmitted classification information, the customer may notify the platform provider. Thereafter, the method may comprise instructing the service provider associated with the selected classified service, to provide the selected classified service to the customer. Specifically, service provider may be instructed (or notified) via the platform, following which, the service provider provides the selected classified service to the customer. Further the classification information can be either public or encrypted for access limitation.

Optionally, the method may further comprise making a payment to the service provider to receive the classified service. Specifically, the customer may make the payment via the platform to the service provider. It may be evident that the service provider may provide the classified service to the customer only upon receiving such payment.

According to an embodiment, the method may further comprise classifying the platform provider associated with the platform to generate classification information pertaining to the platform provider. Specifically, the platform provider may be classified by the at least one classification provider. In another embodiment, the method may further comprise classifying the customer to generate classification information pertaining to the customer.

A computing device associated with a platform provider is operable to implement the platform associated with the digital store. In an embodiment, the computing device may include hardware, software, firmware, or a combination of these suitable for implementing the platform. Examples of the computing device include, but are not limited to, servers, cloud service, desktop computers and laptop computers etc. According to an embodiment, the computing device associated with the platform provider may include a memory unit to store classification information pertaining to the service and/or the service provider. Optionally, the memory unit may also store classification information pertaining to the platform provider and/or the customer.

Further, at least one device is associated with at least one classification provider registered as a classification authority with the platform to classify the service, wherein the at least one device is communicably coupled to the computing device via a network. In an embodiment, the at least one device associated with the registered at least one classification provider may include hardware, software, firmware, or a combination of these, suitable for classifying the service and/or the service provider. Examples of the at least one device include, but are not limited to, computers and laptops. Further, the at least one device may also be suitable for communicating with at least one of the platform provider, the service provider, and the customer via the network. Examples of the network, include, but are not limited to Internet, cellular network, and radio network.

Optionally, security level of the network may be audited by either a third party auditor or the platform provider to ensure a prescribed standard of security of the network. Specifically, a high security level of the network may facilitate safety of data transmissions and payments pertaining to management of the service between the platform provider, the at least one classification provider, the service provider, and the customer. In an example, Hyper Text Transfer Protocol Secure (HTTPS) protocol may be utilised for securing communication in the network.

Further, a service provider device is associated with the service provider of the classified service. The service provider device is communicably coupled to the computing device via the network. In an embodiment, the service provider device may include hardware, software, firmware, or a combination of these, suitable for communicating with the at least one classification provider and the customer via the platform, and providing the service to the customer. Examples of the service provider device include, but are not limited to, servers, cloud service, desktop computers, tablet computers, laptops, and smartphones.

In an embodiment, the system may further comprise a customer device associated with a customer selecting the classified service, wherein the customer device is communicably coupled to the computing device via the network. In an embodiment, the customer device may include hardware, software, firmware, or a combination of these, suitable for viewing the classified services hosted by the platform, selecting the classified service, verifying the classification information of the selected classified service, and optionally, making the payment to the service provider to receive the classified service. Examples of the customer device include, but are not limited to, desktop computers, tablet computers, laptops, and smartphones.

Additionally/alternatively: According to embodiments an additional field of business to the digital store is disclosed: providing certifications for service providers, users and other certification providers. Embodiments provide end-to-end cryptographic verification of certified publishers and service providers. In said embodiment there is no direct man in the middle attack vector on the digital store implementation. I.e. customer can choose to trust a specific Certification Provider, mitigating Man-In-The-Middle attacks against the Platform Provider.

As a further example related to signing of a certification information

Step 1S: Calculate hash (i.e. SHA256) from data

Step 2S. Encrypt hash with signer's private key (i.e. RSA 2048 bit key)

Example technical method of verifying the certification information:

Step 1V. Calculate hash (i.e. SHA256) from message data, excluding the signature part Step 2V. Decrypt signature (encrypted hash) using signer's public key (i.e. RSA 2048 bit key)

Step 3V. Compare calculated hash and decrypted signature, if they are different, signature is not valid.

DETAILED DESCRIPTION OF THE DRAWINGS

Referring to FIG. 1, illustrated is a schematic illustration of a system 100 for managing a service associated with a service provider, in accordance with an embodiment of the present disclosure. The system 100 comprises a computing device 102 associated with a platform provider, 1st and 2nd devices 104 and 106 associated with 1st and 2nd classification providers respectively, and a service provider device 108 associated with a service provider of a classified service. As shown, the 1st and 2nd devices 104 and 106 and the service provider device 108 are communicably coupled to the computing device 102 via a network 110. The computing device 102 is operable to implement a platform associated with a digital store. The 1st and 2nd classification providers are registered as a classification authority with the platform to classify the service and/or the service provider. Further, the system 100 also comprises a customer device 112, associated with a customer selecting the classified service. The customer device 112 may be communicably coupled to the computing device 102 via the network 110

Figure 2:
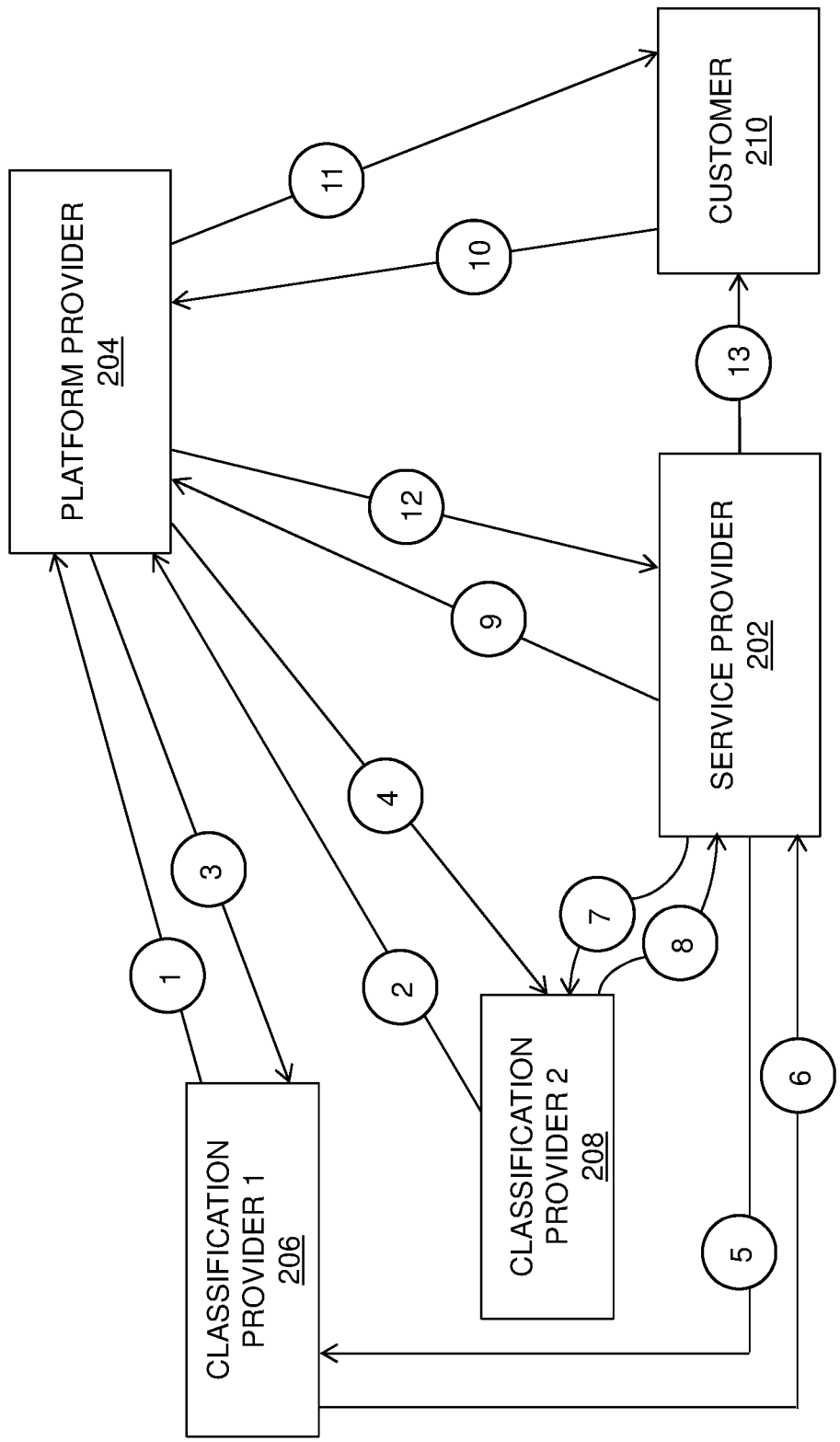
FIG. 2 is an illustration of operational steps of the system for managing the service associated with the service provider, in accordance with an embodiment of the present disclosure.

Referring to FIG. 2, illustrated are operational steps of the system 100 (of FIG. 1) for managing the service associated with the service provider 202, in accordance with an embodiment of the present disclosure. As shown, entities such as the service provider 202 (associated with the service provider device 108), a platform provider 204 (associated with the computing device 102), a 1st classification provider 206 (associated with the 1st device 104), a 2nd classification provider 208 (associated with the 2nd device 106), and a customer 210 (associated with the customer device 112) interact for managing the service. At step 1, the 1st classification provider 206 sends a request for registration as classifying authority with a platform to the platform provider 204. At step 2, the 2nd classification provider 208 sends a request for registration as classifying authority with the platform to the platform provider 204. At step 3, the platform provider 204 approves the received request for registration of the 1st classification provider 206. At step 4, the platform provider 204 approves the received request for registration of the 2nd classification provider 208. At step 5, the service provider 202 sends a request for classification of the service to the 1st classification provider 206. At step 6, the 1st classification provider 206 classifies the service to generate classification information pertaining to the service. At step 7, the service provider 202 sends a request for classification thereof to the 2nd classification provider 208. At step 8, the 2nd classification provider 208 classifies the service provider 202 to generate classification information pertaining to the service provider 202. Therefore, the service is understood to be a classified service. At step 9, the service provider 202 requests the platform provider 204 to host classification information (or additionally the classified service) on the platform. At step 10, the customer 210 selects the classified service hosted at the platform. At step 11, the platform provider 204 transmits the classification information pertaining to the selected classified service to the customer 210. Thereafter, upon verification of the transmitted classification information by the customer 210, at step 12, the platform provider 204 instructs the service provider 202 associated with the selected classified service, to provide the selected classified service to the customer 210. At step 13, the service provider 202 provides the selected classified service to the customer 210.

The steps 1 to 13 are only illustrative and other alternatives can also be provided where one or more steps are added, one or more steps are removed, or one or more steps are provided in a different sequence without departing from the scope of the claims herein.

Figure 3:
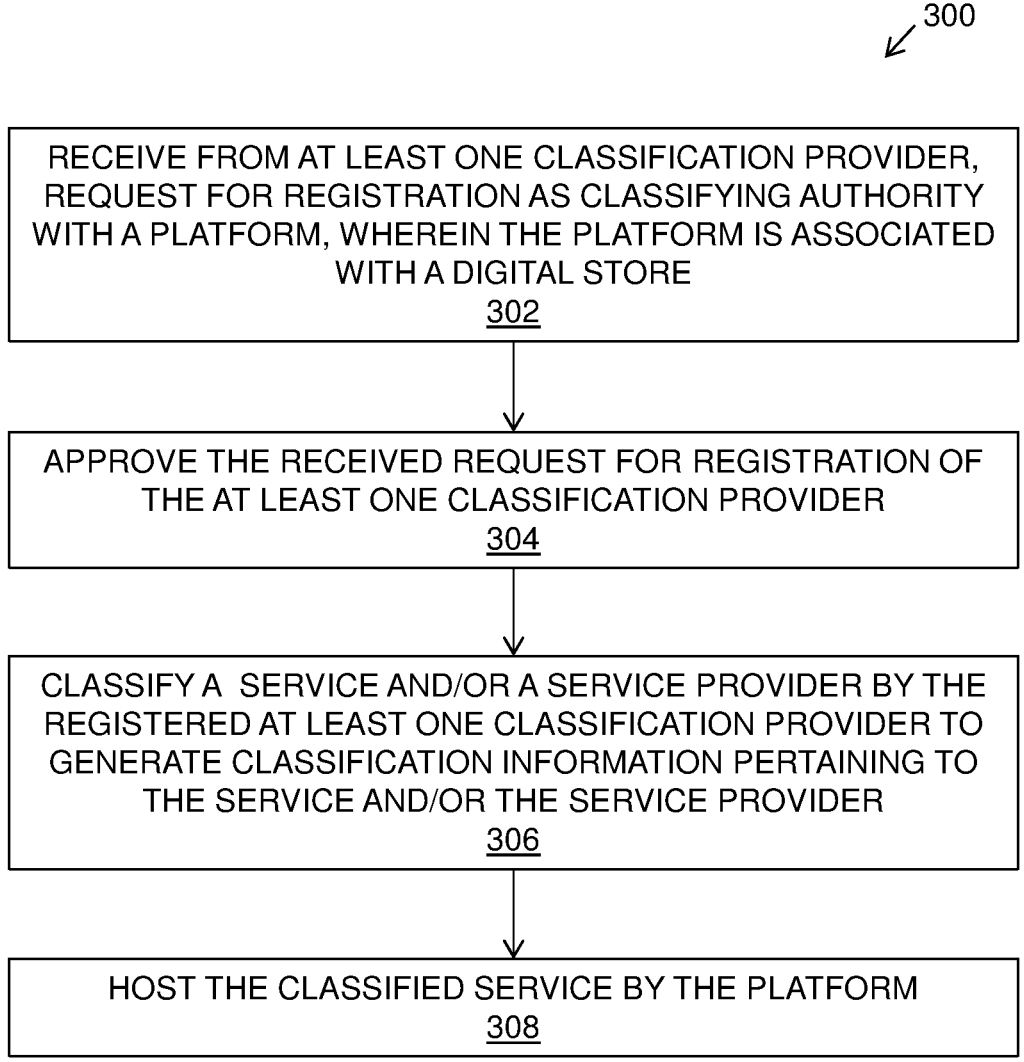
FIG. 3 is an illustration of steps of a method for managing a service associated with a service provider, in accordance with an embodiment of the present disclosure.

Referring to FIG. 3, illustrated are the steps of a method 300 for managing a service associated with a service provider, in accordance with an embodiment of the present disclosure. At step 302, a request for registration as classifying authority with a platform is received from at least one classification provider, wherein the platform is associated with a digital store. At step 304, the received request for registration of the at least one classification provider is approved. At step 306, the service and/or the service provider is classified by the registered at least one classification provider to generate classification information pertaining to the service and/or the service provider. At step 308, the classified service is hosted by the platform. Further/as an example the classification information can be a cryptographically verifiable certificate.

The steps 302 to 308 are only illustrative and other alternatives can also be provided where one or more steps are added, one or more steps are removed, or one or more steps are provided in a different sequence without departing from the scope of the claims herein. For example, the method 300 may further comprise receiving selection of the classified service from a customer, transmitting the classification information pertaining to the selected classified service to the customer, receiving verification of the transmitted classification information from the customer, and instructing the service provider associated with the selected classified service, to provide the selected classified service to the customer. Optionally, the method 300 may comprise making a payment to the at least one classification provider to obtain the classification information pertaining to the service and/or the service provider. In an example, in method 300 approving the received request for registration of the at least one classification provider may further comprise validating credentials of the at least one classification provider and providing classification certificates for the at least one classification provider. In the method 300, classification certificates for the at least one classification provider may be cryptographically verifiable. Optionally, in method 300 the classification information pertaining to the service and/or the service provider may be in form of a digital certificate. Further, in method 300 the classification information pertaining to the service and/or the service provider may be cryptographically verifiable. Optionally the method 300 may further comprise classifying a platform provider associated with the platform to generate classification information pertaining to the platform provider. More optionally, the method 300 may comprise classifying the customer to generate classification information pertaining to the customer Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for managing, within a platform, a service associated with a service provider, the method comprising:
   receiving from a classification provider, a request for registration as a classifying authority with the platform, wherein the platform is associated with a digital store and the request for registration comprises a classification provider public key;
   approving the received request for registration and generating a classification certificate for the classification provider;
   receiving, from the service provider, a classification information certificate, wherein the classification information certificate comprises a digital signature and one or more of a granted classification of the service and a granted classification of the service provider, and wherein validity of the digital signature is based on the classification provider public key, and
   hosting the classification information certificate by the platform,
   wherein the granted classification is based on one or more of a historical data pertaining to one or more of the service and the service provider, a security audit of the service, and business metrics.

2. The method according to claim 1, wherein the method further comprises:
   receiving selection of the service from a customer;
   transmitting the classification information certificate to the customer;
   receiving verification of the transmitted classification information certificate from the customer; and
   instructing the service provider associated with the service, to provide the service to the customer.

3. The method according to claim 1, wherein the method further comprises making a payment to the at least one classification provider to obtain the classification information pertaining to the service and/or the service provider.

4. The method according to claim 1, wherein approving the received request for registration of the at least one classification provider comprises validating credentials of the at least one classification provider.

5. The method according to claim 4, wherein the classification certificate for the at least one classification provider is cryptographically verifiable.

6. The method according to claim 1, wherein the classification information certificate is in form of a digital certificate.

7. The method according to claim 6, wherein the classification information certificate is cryptographically verifiable based on the classification certificate.

8. The method according to claim 1, wherein the method further comprises classifying a platform provider associated with the platform to generate a platform provider classification information certificate pertaining to the platform provider.

9. The method according to claim 2, wherein the method further comprises classifying the customer to generate a customer classification information certificate pertaining to the customer.

10. The method according to claim 1, wherein prior to generating the classification certificate, payment is made to the platform by the at least one classification provider.

11. The method according to claim 2, wherein the customer verifies the transmitted classification by decrypting the transmitted classification information using a public key of the classification provider and a private key of the customer.

12. The method according to claim 2, further comprising the customer making payment via the platform to the service provider in order to receive the service.

13. An apparatus for managing a service associated with a service provider, the apparatus comprising a computing device coupled to a memory unit wherein the computing device is configured to implement a platform associated with a digital store, and wherein the computing device includes at least one processor configured to:
   receive a request for registration as a classifying authority with the platform, wherein the platform is associated with the digital store and the request for registration comprises a classification provider public key;
   approve the received request for registration and generate a classification certificate for a classification provider;
   receive, from the service provider, a classification information certificate, wherein the classification information certificate comprises a digital signature and one or more of a granted classification of the service and a granted classification of the service provider, and wherein validity of the digital signature is based on the classification provider public key, and
   host the classification information certificate by the platform,
   wherein the granted classification is based on one or more of a historical data pertaining to one or more of the service and the service provider, a security audit of the service, and business metrics.

14. The apparatus according to claim 13 wherein the processor of the computing device is further configured to:
   receive a selection of the service;
   transmit the classification information certificate;
   receive verification of the transmitted classification information certificate; and instruct the service provider associated with the service, to provide the service to the customer.

15. The method according to claim 1, wherein the classification information certificate comprises both of the granted classification of the service and the granted classification of the service provider.

16. The apparatus according to claim 13, wherein the classification information certificate comprises both of the granted classification of the service and the granted classification of the service provider.

* * * * *